(12) United States Patent
Kadle et al.

(10) Patent No.: US 7,228,689 B2
(45) Date of Patent: Jun. 12, 2007

(54) THERMO-ELECTRIC AND HVAC SEAT COOLING AND HEATING MODE DOOR INTEGRATION

(75) Inventors: Prasad Shripad Kadle, East Amherst, NY (US); Edward Wolfe, IV, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 216 days.

(21) Appl. No.: 11/133,603

(22) Filed: May 20, 2005

(65) Prior Publication Data

US 2006/0260337 A1    Nov. 23, 2006

(51) Int. Cl.
*F25B 1/00*    (2006.01)
(52) U.S. Cl. .............................. 62/115; 62/239; 62/244
(58) Field of Classification Search .................. 62/115, 62/239, 404, 407, 408, 410, 411; 165/42, 165/43; 454/121, 127, 155, 161
See application file for complete search history.

(56) References Cited

U.S. PATENT DOCUMENTS

| | | | | |
|---|---|---|---|---|
| 5,106,018 A | * | 4/1992 | Loup ..................... 237/12.3 B |
| 5,305,823 A | * | 4/1994 | Elliot ........................... 165/41 |
| 5,862,677 A | * | 1/1999 | Kim et al. ..................... 62/244 |
| 6,036,594 A | * | 3/2000 | Kwon et al. ................. 454/156 |
| 6,101,828 A | * | 8/2000 | Shikata et al. ................. 62/244 |
| 6,382,305 B1 | * | 5/2002 | Sano ........................... 165/43 |
| 6,422,309 B2 | * | 7/2002 | Vincent ...................... 165/204 |
| 6,588,222 B1 | * | 7/2003 | Urbank et al. ................. 62/127 |

FOREIGN PATENT DOCUMENTS

| | | |
|---|---|---|
| DE | 4235564 A1 | 4/1994 |
| EP | 0125976 A | 11/1984 |
| EP | 0756955 A | 2/1997 |
| JP | 4-349013 A | * 12/1992 |

OTHER PUBLICATIONS

EP 06 07 5976—European Search Report—dated Jul. 24, 2006.

* cited by examiner

*Primary Examiner*—Mohammad M. Ali
(74) *Attorney, Agent, or Firm*—Patrick M. Griffin

(57) ABSTRACT

A heating and cooling and air conditioning (HVAC) module housing wherein the defrost outlet and the vent outlet and the seat outlet are disposed next adjacent to one another and a first plate overlies the defrost outlet and the seat outlet and a second plate overlies the seat outlet and the vent outlet for opening and closing various combinations of the outlets. Accordingly, the defrost valve and the vent valve are used to also control air flow through the seat outlet of a HVAC module to a thermo-electric device to heat and cool the seat assembly in a vehicle.

19 Claims, 2 Drawing Sheets

THERMO-ELECTRIC AND HVAC SEAT COOLING AND HEATING MODE DOOR INTEGRATION

BACKGROUND OF THE INVENTION

1. Field of the Invention

A heating and cooling and air conditioning (HVAC) module of the type used in an automotive vehicle for providing conditioned air to vents in the cabin of a vehicle and to the defrost outlet and to a seat conditioning device for cooling and/or heating a seat assembly in the vehicle cabin.

2. Description of the Prior Art

The HVAC module currently in use normally includes a housing defining an air passage with at least one air conditioning system, such as an evaporator and/or heater, supported in the air passage in the housing for cooling and heating the air. The housing presents a defrost outlet for exiting air from the air passage to a defrost vent in a vehicle cabin, a vent outlet for exiting air from the air passage to a cabin vent in the vehicle cabin, and a seat outlet for exiting air from the air passage directly to a perforated seat assembly or first through an air conditioning device or thermo-electric device in the vehicle cabin. In order to allow the operator to regulate the air flow to the seat assembly, a separate valve is placed in the air flow path between the HVAC module and the seat assembly. The valve is used to regulate the air flow to cool or heat the seat independently of other functions of the HVAC module.

SUMMARY OF THE INVENTION AND ADVANTAGES

In accordance with the subject invention, the defrost outlet and the vent outlet and the seat outlet are disposed next adjacent to one another in the housing of the HVAC module and a first valve overlies the defrost and the seat outlet and a second valve overlies the seat outlet and the vent outlet for opening and closing various combinations of the outlets.

The invention therefore also provides a method of operating such a HVAC module comprising the steps of moving the first valve and the second valve to a vent position with the first valve in a closed position extending across the defrost outlet and a portion of the seat outlet and the second valve opening the vent outlet and closing a portion of the seat outlet, moving the first valve and the second valve to a vent-seat position with the first valve opening a portion of the seat outlet and closing the defrost outlet and with the second valve opening the vent outlet and closing a portion of the seat outlet, moving the first valve and the second valve to a defrost position with the second valve closing the vent outlet and a portion of the seat outlet and with the first valve opening the defrost outlet and closing a portion of the seat outlet, and moving the first valve and the second valve to a defrost-seat position with the first valve opening the defrost outlet and closing a portion of the seat outlet and with the second valve opening a portion of the seat outlet while closing the vent outlet.

Accordingly, the valve regulating the air flow to the seat assembly, whether through a thermo-electric device or not, is integrated into the defrost valve and the vent valve and the operation thereof. Since each of the defrost valve and the vent valve has a position where the valve is not moving, the valves can be used while in this position for the purpose of controlling air flow to the seat assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
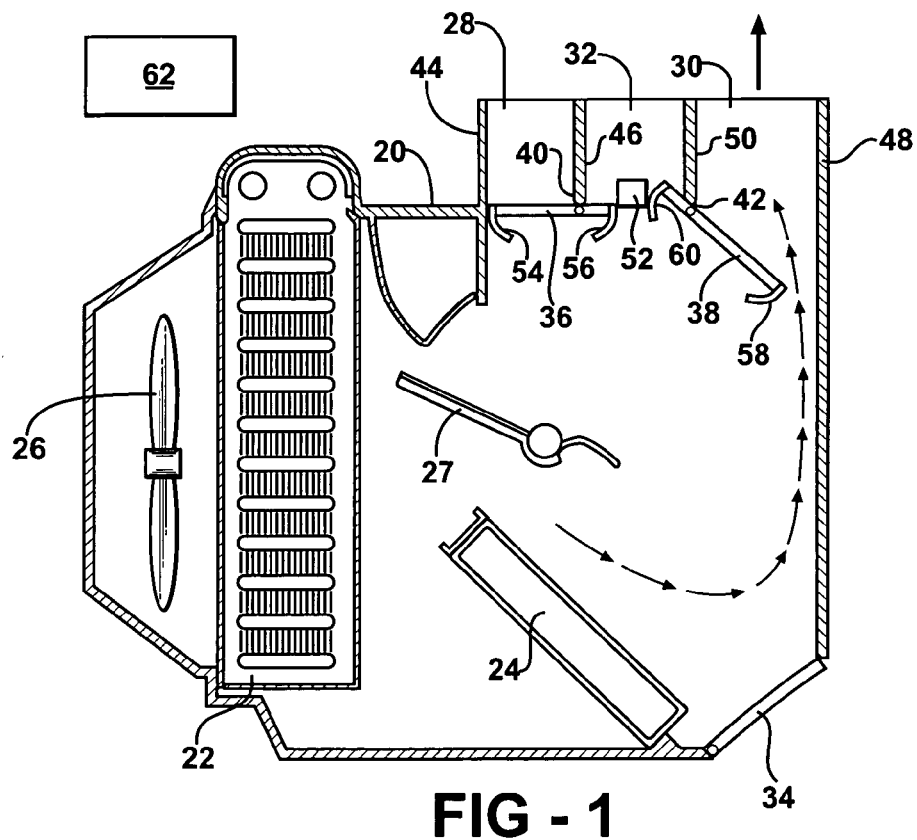
FIG. 1 is a schematic view of a HVAC module in vent position.

Referring to the Figures, a heating and cooling and air conditioning (HVAC) module is shown schematically in each of the Figures.

As is well known in the art, the module includes a housing 20 defining an air passage and at least one air conditioning system in the air passage in the housing 20 for conditioning air as it passes through the housing 20. The housing 20 normally supports such an air conditioning system, which may be any one or more of an evaporator 22, a heater 24 and a blower 26 for moving the air through the housing 20. A control panel 27 is movable to control the flow of air through the heater 24. A defrost outlet 28 is presented in the housing 20 for exiting air from the air passage to a defrost vent in a vehicle cabin. A vent outlet 30 is presented in the housing 20 for exiting air from the air passage to a cabin vent in the vehicle cabin. A seat outlet 32 is presented in the housing 20 for exiting air from the air passage to a seat air conditioning device in the vehicle cabin. The seat air conditioning device may comprise a thermo-electric device for heating and cooling air from the seat outlet 32 for delivery to a seat assembly. A door 34 controls the flow of air from the blower 26 through the heater 24 or directly to the outlets 28, 30, 32. A floor door 34 is disposed in the housing 20 for opening to supply air to the cabin when the module is in the defrost position and in the defrost-seat position, which positions will became more clear as the description proceeds.

The defrost outlet 28 and the vent outlet 30 and the seat outlet 32 are disposed next adjacent to one another and a first valve defined by a first plate 36 overlies the defrost outlet 28 and the seat outlet 32 and a second valve defined by a second plate 38 overlies the seat outlet 32 and the vent outlet 30 for opening and closing various combinations of the outlets 28, 30, 32. More specifically, the first plate 36 overlies the defrost outlet 28 and a first portion of the seat outlet 32 and the second plate 38 overlies a second portion of the seat outlet 32 and the vent outlet 30. A first pivot 40 or hinge is disposed between the defrost outlet 28 and the seat outlet 32 and the first plate 36 is rotationally supported on the first pivot 40 for movement between an open position (FIGS. 3 & 4) and a closed position (FIGS. 1 & 2) for controlling air flow to the defrost outlet 28 and to the seat outlet 32. A second pivot 42 or hinge is disposed between the seat outlet 32 and the vent outlet 30 and the second plate 38 is rotationally supported on the second pivot 42 for movement between an open position (FIGS. 1 & 2) and a closed position (FIGS. 3 & 4) for controlling air flow to the seat outlet 32 and to the vent outlet 30.

The defrost outlet 28 includes a defrost outside partition 44 and a defrost inside partition 46 and, in a similar fashion, the vent outlet 30 includes a vent outside partition 48 and a vent inside partition 50. Accordingly, the seat outlet 32 is defined between the defrost inside partition 46 and the vent inside partition 50.

The first pivot 40 is disposed on the bottom of the defrost inside partition 46 and the second pivot 42 is disposed on the bottom of the vent inside partition 50. A valve seat 52 is disposed in the middle of the seat outlet 32 for co-acting with each of the first plate 36 and the second plate 38 for controlling air flow through the seat outlet 32. As alluded to above, each of the first plate 36 and the second plate 38 extends over a portion of the seat outlet 32 that is approximately one half of the seat outlet 32.

The first plate 36 presents a defrost side edge disposed adjacent the defrost outside partition 44 in the closed position and a defrost-seat side edge disposed adjacent the valve seat 52 in the closed position and a defrost flap 54 is disposed along the defrost side edge for remaining in engagement with the defrost outside partition 44 during partial rotational movement of the first plate 36 to prevent air flow through the defrost outlet 28 until the first plate 36 rotates sufficiently to move the defrost flap 54 out of engagement with the defrost outside partition 44. Similarly, a defrost-seat flap 56 is disposed along the defrost-seat side edge for remaining in engagement with the valve seat 52 during partial rotational movement of the first plate 36 to prevent air flow through the seat outlet 32 until the first plate 36 rotates sufficiently to move the defrost-seat flap 56 out of engagement with the valve seat 52. The second plate 38 also presents a vent side edge disposed adjacent the vent outside partition 48 in the closed position and a vent-seat side edge disposed adjacent the valve seat 52 in the closed position and a vent flap 58 is disposed along the vent side edge for remaining in engagement with the vent outside partition 48 during partial rotational movement of the second plate 38 to prevent air flow through the vent outlet 30 until the first plate 36 rotates sufficiently to move the vent flap 58 out of engagement with the vent outside partition 48. Again similarly, a vent-seat flap 60 is disposed along the vent-seat side edge for remaining in engagement with the valve seat 52 during partial rotational movement of the second plate 38 to prevent air flow through the seat outlet 32 until the second plate 38 rotates sufficiently to move the vent-seat flap 60 out of engagement with the valve seat 52. Each of the flaps 54, 56, 58, 60 is arcuate or curved away from the edge to which it is attached in an arc about the associated pivot 40, 42 for remaining in contact with the adjacent partition 44, 46, 48, 50 during partial rotation of the plate 36, 38 until the plate 36, 38 rotates sufficiently to move the flap 54, 56, 58, 60 out of engagement with the adjacent partition 44, 46, 48, 50.

A controller 62 is included for operating the system and would include electrical motors or mechanical input for rotating the plates 36, 38 and a processor for positioning the plates 36, 38 in accordance with operator input and/or the computer settings.

As illustrated in FIG. 1, the controller 62 may move the first plate 36 and the second plate 38 to a vent position with the first plate 36 in the closed position extending between the defrost outside partition 44 and the valve seat 52 and the second plate 38 opening the vent outlet 30 by rotation to a position with the vent flap 58 out of engagement with the vent outside partition 48 and the vent-seat flap 60 in contact with the valve seat 52.

Figure 2:
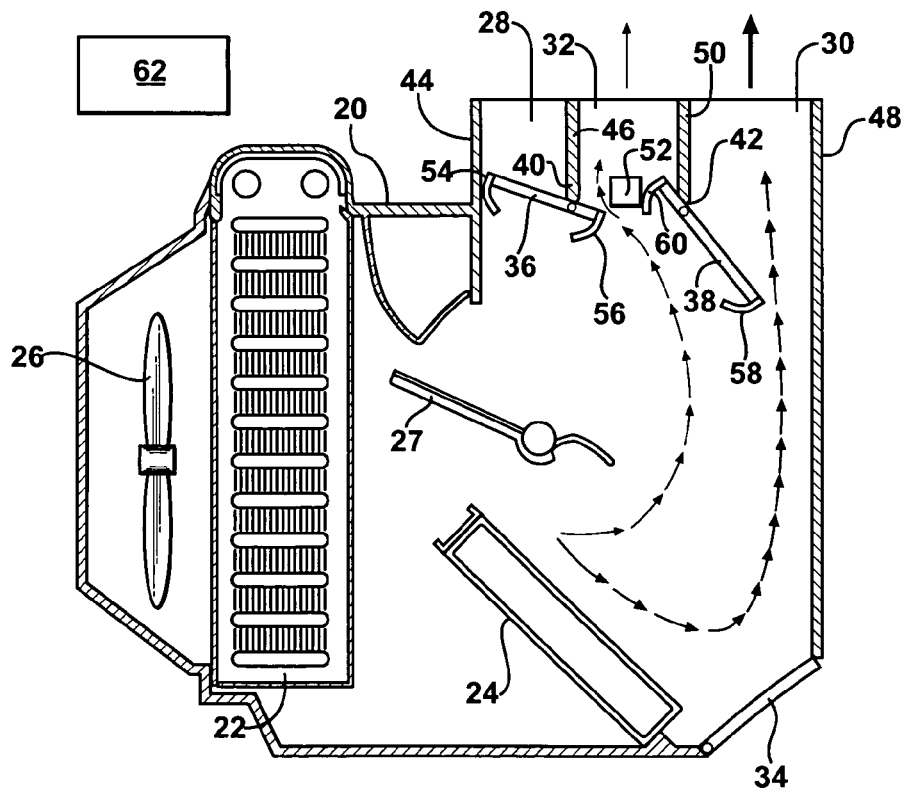
FIG. 2 is a schematic view of a HVAC module in vent-seat position.

As illustrated in FIG. 2, the controller 62 may move the first plate 36 and the second plate 38 to a vent-seat position with the first plate 36 opening the seat outlet 32 by rotation to a position with the vent-seat flap 60 out of engagement with the valve seat 52 and the defrost flap 54 in contact with the defrost outside partition 44 and the second plate 38 opening the vent outlet 30 by rotation to a position with the vent flap 58 out of engagement with the vent outside partition 48 and the vent-seat flap 60 in contact with the valve seat 52.

Figure 3:
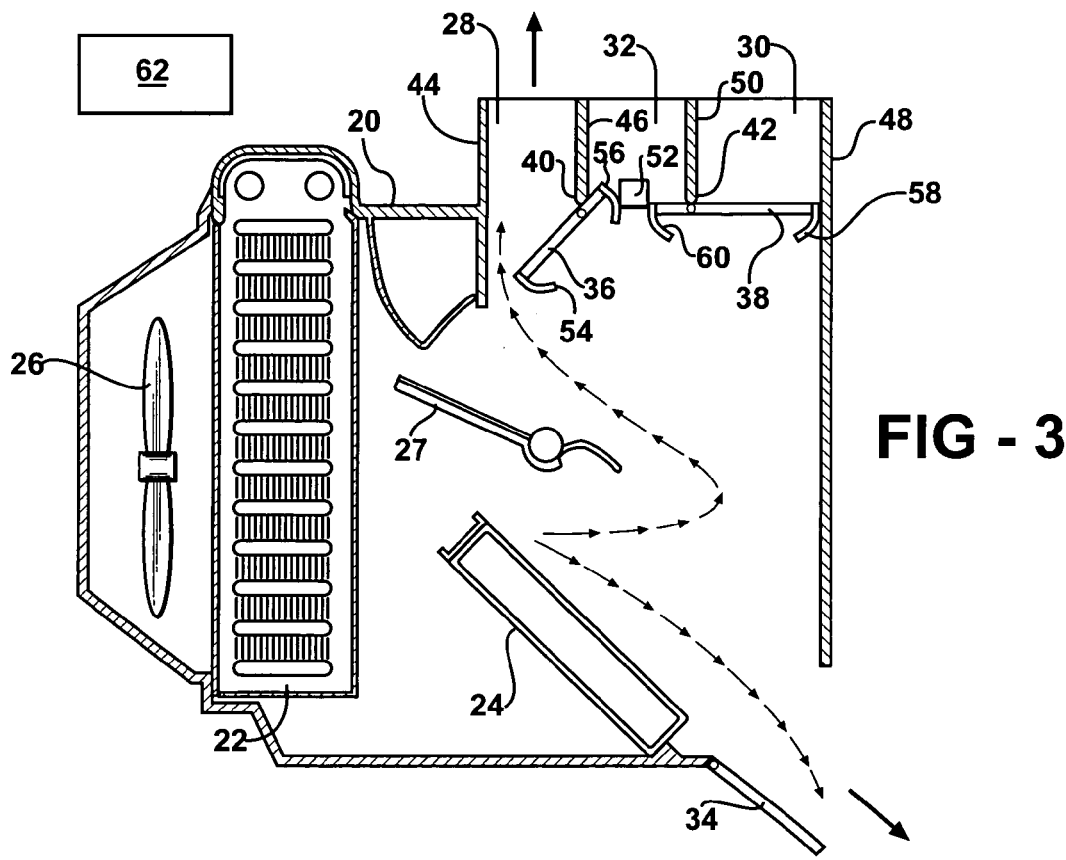
FIG. 3 is a schematic view of a HVAC module in defrost position.

As illustrated in FIG. 3, the controller 62 may move the first plate 36 and the second plate 38 to a defrost position with the second plate 38 in the closed position extending between the vent outside partition 48 and the valve seat 52 and the first plate 36 opening the defrost outlet 28 by rotation to a position with the defrost flap 54 out of engagement with the defrost outside partition 44 and the defrost-seat flap 56 in contact with the valve seat 52.

Figure 4:
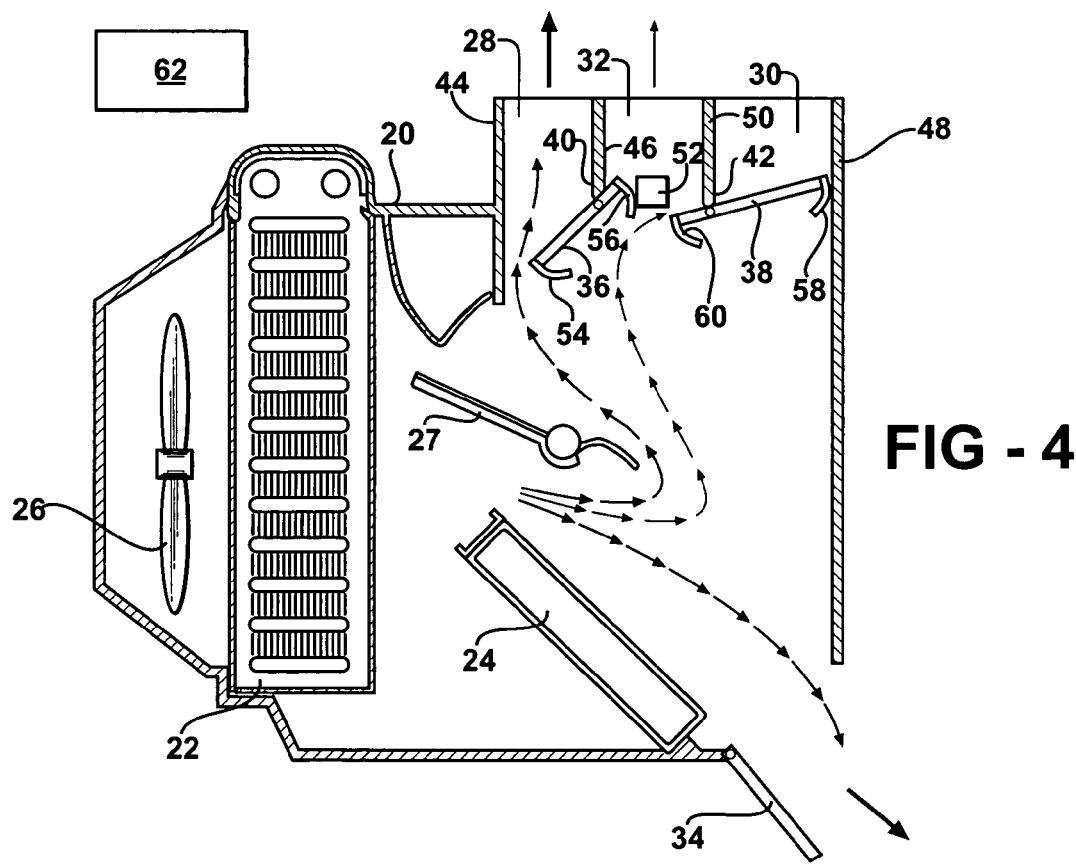
FIG. 4 is a schematic view of a HVAC module in defrost-seat position.

As illustrated in FIG. 4, the controller 62 may move the first plate 36 and the second plate 38 to a defrost-seat position with the first plate 36 opening the defrost outlet 28 by rotation to a position with the defrost flap 54 out of engagement with the defrost outside partition 44 and the defrost-seat flap 56 in contact with the valve seat 52 and the second plate 38 opening the seat outlet 32 by rotation to a position with the vent-seat flap 60 out of engagement with the valve seat 52 and the vent flap 58 in contact with the vent outside partition 48.

As alluded to above, each of the first plate 36, controlling the defrost outlet 28, and the second plate 38, controlling the vent outlet 30, have idle or closed positions in various modes of operation that are used to control the seat outlet 32, as does the heater 24 valve. The following chart shows these idle or closed positions and how the first pate and second plate 38 defining the defrost and vent valves are used to control the air flow to the seat assembly.

| Mode | Defrost (1$^{st}$) Valve | Vent (2$^{nd}$) valve |
| --- | --- | --- |
| Vent | Idle (closed) | open |
| Blend | Idle (closed) | % open |
| Foot | % open | Idle (closed) |
| Foot-Defrost | % open | Idle (closed) |
| Defrost | open | Idle (closed) |

By utilizing the idle or closed positions in the various modes of operation, the defroster door 34 or first plate 36 and vent door 34 or second plate 38 can be positioned to allow air flow to the seat assembly via the seat outlet 32. This is accomplished by using the valve seat 52 as a variable valve stop.

Accordingly, a method is provided for operating a heating and cooling and air conditioning (HVAC) module having a defrost outlet 28 and a vent outlet 30 and a seat outlet 32 disposed next adjacent to one another and a first plate 36 overlying the defrost outlet 28 and the seat outlet 32 and a second plate 38 overlying the seat outlet 32 and the vent outlet 30 for opening and closing various combinations of the outlets 28, 30, 32.

The method includes the steps of moving the first plate 36 and the second plate 38 to a vent position with the first plate 36 in a closed position extending across the defrost outlet 28 and a portion of the seat outlet 32 and the second plate 38 opening the vent outlet 30 and closing a portion of the seat outlet 32, moving the first plate 36 and the second plate 38 to a vent-seat position with the first plate 36 opening a portion of the seat outlet 32 and closing the defrost outlet 28 and with the second plate 38 opening the vent outlet 30 and closing a portion of the seat outlet 32, moving the first plate 36 and the second plate 38 to a defrost position with the second plate 38 closing the vent outlet 30 and a portion of the seat outlet 32 and with the first plate 36 opening the defrost outlet 28 and closing a portion of the seat outlet 32, and moving the first plate 36 and the second plate 38 to a defrost-seat position with the first plate 36 opening the defrost outlet 28 and closing a portion of the seat outlet 32 and with the second plate 38 opening a portion of the seat outlet 32 while closing the vent outlet 30.

Obviously, many modifications and variations of the present invention are possible in light of the above teachings. The invention may be practiced otherwise than as specifically described within the scope of the appended claims.

What is claimed is:

1. A heating and cooling and air conditioning (HVAC) module comprising;
a housing defining an air passage,
at least one air conditioning system in said air passage in said housing,
a defrost outlet in said housing for exiting air from said air passage to a defrost vent in a vehicle cabin,
a vent outlet in said housing for exiting air from said air passage to a cabin vent in the vehicle cabin,
a seat outlet in said housing for exiting air from said air passage to a seat air conditioning device in the vehicle cabin, and
characterized by said defrost outlet and said vent outlet and said seat outlet being disposed next adjacent to one another and including a first valve overlying said defrost outlet and said seat outlet and a second valve overlying said seat outlet and said vent outlet for opening and closing various combinations of said outlets.

2. A module as set forth in claim 1 wherein said first valve overlies said defrost outlet and a first portion of said seat outlet and said second valve overlies a second portion of said seat outlet and said vent outlet.

3. A module as set forth in claim 2 including a first pivot disposed between said defrost outlet and said seat outlet and said first valve includes a first plate rotationally supported on said first pivot for movement between an open position and a closed position for controlling air flow to said defrost outlet and to said seat outlet.

4. A module as set forth in claim 3 including a second pivot disposed between said seat outlet and said vent outlet and said second valve includes a second plate rotationally supported on said second pivot for movement between an open position and a closed position for controlling air flow to said seat outlet and to said vent outlet.

5. A module as set forth in claim 4 including a valve seat disposed in said seat outlet for co-acting with each of said first plate and said second plate for controlling air flow through said seat outlet.

6. A module as set forth in claim 5 wherein said defrost outlet includes a defrost outside partition and a defrost inside partition.

7. A module as set forth in claim 6 wherein said vent outlet includes vent outside partition and a vent inside partition.

8. A module as set forth in claim 7 wherein said seat outlet is defined between said defrost inside partition and said vent inside partition.

9. A module as set forth in claim 8 wherein said first pivot is dispose on said defrost inside partition and said second pivot is disposed on said vent inside partition.

10. A module as set forth in claim 9 wherein said first plate presents a defrost side edge disposed adjacent said defrost outside partition in said closed position and a defrost-seat side edge disposed adjacent said valve seat in said closed position, and including a defrost flap disposed along said defrost side edge for remaining in engagement with said defrost outside partition during rotational movement of said first plate to prevent air flow through said defrost outlet until said first plate rotates sufficiently to move said defrost flap out of engagement with said defrost outside partition, a defrost-seat flap disposed along said defrost-seat side edge for remaining in engagement with said valve seat during rotational movement of said first plate to prevent air flow through said seat outlet until said first plate rotates sufficiently to move said defrost-seat flap out of engagement with said valve seat.

11. A module as set forth in claim 10 wherein said second plate presents a vent side edge disposed adjacent said vent outside partition in said closed position and a vent-seat side edge disposed adjacent said valve seat in said closed position, and including a vent flap disposed along said vent side edge for remaining in engagement with said vent outside partition during rotational movement of said second plate to prevent air flow through said vent outlet until said first plate rotates sufficiently to move said vent flap out of engagement with said vent outside partition, a vent-seat flap disposed along said vent-seat side edge for remaining in engagement with said valve seat during rotational movement of said second plate to prevent air flow through said seat outlet until said second plate rotates sufficiently to move said vent-seat flap out of engagement with said valve seat.

12. A module as set forth in claim 11 including a floor outlet for exiting air to the cabin of a vehicle.

13. A module as set forth in claim 12 including a controller for moving said first plate and said second plate to a vent position with said first plate in said closed position extending between said defrost outside partition and said valve seat and said second plate opening said vent outlet by rotation to a position with said vent flap out of engagement with said vent outside partition and said vent-seat flap in contact with said valve seat.

14. A module as set forth in claim 12 including a controller for moving said first plate and said second plate to a vent-seat position with said first plate opening said seat outlet by rotation to a position with said vent-seat flap out of engagement with said valve seat and said defrost flap in contact with said defrost outside partition and said second plate opening said vent outlet by rotation to a position with said vent flap out of engagement with said vent outside partition and said vent-seat flap in contact with said valve seat.

15. A module as set forth in claim 12 including a controller for moving said first plate and said second plate to a defrost position with said second plate in said closed position extending between said vent outside partition and said valve seat and said first plate opening said defrost outlet by rotation to a position with said defrost flap out of engagement with said defrost outside partition and said defrost-seat flap in contact with said valve seat.

16. A module as set forth in claim 12 including a controller for moving said first plate and said second plate to a defrost-seat position with said first plate opening said defrost outlet by rotation to a position with said defrost flap out of engagement with said defrost outside partition and said defrost-seat flap in contact with said valve seat and said second plate opening said seat outlet by rotation to a position with said vent-seat flap out of engagement with said valve seat and said vent flap in contact with said vent outside partition.

17. A module as set forth in claim 12 including a controller for moving said first plate and said second plate to a vent position with said first plate in said closed position extending between said defrost outside partition and said valve seat and said second plate opening said vent outlet by rotation to a position with said vent flap out of engagement with said vent outside partition and said vent-seat flap in contact with said valve seat, and for moving said first plate and said second plate to a vent-seat position with said first plate opening said seat outlet by rotation to a position with said vent-seat flap out of engagement with said valve seat and said defrost flap in contact with said defrost outside partition and said second plate opening said vent outlet by rotation to a position with said vent flap out of engagement with said vent outside partition and said vent-seat flap in contact with said valve seat, and for moving said first plate and said second plate to a defrost position with said second plate in said closed position extending between said vent outside partition and said valve seat and said first plate opening said defrost outlet by rotation to a position with said defrost flap out of engagement with said defrost outside partition and said defrost-seat flap in contact with said valve seat, and for moving said first plate and said second plate to a defrost-seat position with said first plate opening said defrost outlet by rotation to a position with said defrost flap out of engagement with said defrost outside partition and said defrost-seat flap in contact with said valve seat and said second plate opening said seat outlet by rotation to a position with said vent-seat flap out of engagement with said valve seat and said vent flap in contact with said vent outside partition.

18. A method of operating a heating and cooling and air conditioning (HVAC) module having a defrost outlet and a vent outlet and a seat outlet disposed next adjacent to one another and a first plate overlying the defrost and the seat outlet and a second plate overlying the seat outlet and the vent outlet for opening and closing various combinations of the outlets, said method characterized by the steps of;

moving the first plate and the second plate to a vent position with the first plate in a closed position extending across the defrost outlet and a portion of the seat outlet and the second plate opening the vent outlet and closing a portion of the seat outlet, moving the first plate and the second plate to a vent-seat position with the first plate opening a portion of the seat outlet and closing the defrost outlet and with the second plate opening the vent outlet and closing a portion of the seat outlet, moving the first plate and the second plate to a defrost position with the second plate closing the vent outlet and a portion of the seat outlet and with the first plate opening the defrost outlet and closing a portion of the seat outlet, and moving the first plate and the second plate to a defrost-seat position with the first plate opening the defrost outlet and closing a portion of the seat outlet and with the second plate opening a portion of the seat outlet while closing the vent outlet.

19. A method as set forth in claim 18 including opening a floor outlet in the defrost position and the defrost-seat position.

* * * * *